US006949236B2

(12) United States Patent
Lal et al.

(10) Patent No.: US 6,949,236 B2
(45) Date of Patent: Sep. 27, 2005

(54) AMINOSULFONATE PRODUCT-TREATED NITROGEN-CONTAINING SALT PARTICLES

(75) Inventors: Kastrui Lal, Solon, OH (US); Alvin E. Haas, Mentor, OH (US); Ricardo M. Collins, Cleveland Heights, OH (US); Jeffrey M. Carey, Mentor, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 300 days.

(21) Appl. No.: 10/416,825

(22) PCT Filed: Nov. 6, 2001

(86) PCT No.: PCT/US01/43652

§ 371 (c)(1),
(2), (4) Date: May 14, 2003

(87) PCT Pub. No.: WO02/49991

PCT Pub. Date: Jun. 27, 2002

(65) Prior Publication Data

US 2004/0022711 A1 Feb. 5, 2004

Related U.S. Application Data

(60) Provisional application No. 60/256,616, filed on Dec. 19, 2000.

(51) Int. Cl.$^7$ .................... C01B 21/20; C01B 25/28; C01C 1/18
(52) U.S. Cl. ............. 423/268; 71/58; 149/45; 149/46; 149/61; 423/310; 423/312; 423/395; 423/396
(58) Field of Search ............... 423/268, 310, 423/312, 395, 396; 71/58; 149/45, 46, 61

(56) References Cited

U.S. PATENT DOCUMENTS

| | | | |
|---|---|---|---|
| 2,720,446 A | | 10/1955 | Whetstone et al. |
| 3,188,307 A | | 6/1965 | Kramer |
| 3,640,697 A | * | 2/1972 | Toops, Jr. ............ 71/27 |
| 3,660,070 A | * | 5/1972 | Maruta et al. ......... 71/64.07 |
| 3,770,390 A | | 11/1973 | Teot ................ 23/300 |
| 3,779,821 A | * | 12/1973 | Fujiki et al. ........... 149/7 |
| 3,922,332 A | * | 11/1975 | Schenk .............. 423/268 |
| 4,001,378 A | | 1/1977 | Jasnosz ............. 423/268 |
| 4,384,903 A | | 5/1983 | Enever ................ 149/7 |
| 4,620,855 A | | 11/1986 | Higgins .............. 44/62 |
| 4,717,555 A | * | 1/1988 | Newman et al. ...... 423/268 |
| 5,041,153 A | | 8/1991 | Detroit ............... 71/25 |
| 5,456,775 A | | 10/1995 | Schapira et al. ..... 149/109.6 |
| 5,472,530 A | * | 12/1995 | Obrestad et al. ........ 149/5 |
| 5,486,246 A | | 1/1996 | Kelley ............... 149/2 |
| 5,527,498 A | | 6/1996 | Kelley ............. 264/3.4 |
| 5,567,910 A | | 10/1996 | Chattopadhyay ....... 149/3 |
| 5,597,977 A | | 1/1997 | Chattopadhyay ....... 149/6 |
| 5,723,812 A | * | 3/1998 | Berteleau et al. ...... 149/46 |
| 6,022,386 A | * | 2/2000 | Vogel et al. ........ 23/313 FB |
| 6,365,120 B1 | * | 4/2002 | Granquist et al. ..... 423/268 |
| 6,572,833 B1 | * | 6/2003 | Cooper et al. ....... 423/266 |

FOREIGN PATENT DOCUMENTS

| | | |
|---|---|---|
| EP | 0 314 468 A | 5/1989 |
| EP | 0 533 024 A | 3/1993 |
| EP | 0 569 118 A | 11/1993 |
| GB | 804 053 A | 11/1958 |
| GB | 1 090 779 A | 11/1967 |
| GB | 1 292 718 A | 10/1972 |
| GB | 1 341 104 A | 12/1973 |

OTHER PUBLICATIONS

Undated commercial publication, "ADEX Crystal Habit Modifiers. Additives for Explosives." (believed to have been distributed in Feb. 2000.).

D. H. Lauriente, CEH Marketing Research Report, "Ammonium Nitrate," Oct., 2000, pages on Ammonium nitrate, "Introduction" and summary of "Prilling."

* cited by examiner

*Primary Examiner*—Wayne A. Langel
(74) *Attorney, Agent, or Firm*—David M. Shold; Michael F. Esposito

(57) ABSTRACT

Addition of an aminosulfonate product to an inorganic nitrogen-containing salt provides a composition of matter with improved properties. In particular, 2-acrylamido-2-methylpropanesulfonic acid and its derivatives can be added to ammonium nitrate to provide improved prills.

16 Claims, No Drawings

AMINOSULFONATE PRODUCT-TREATED NITROGEN-CONTAINING SALT PARTICLES

This application claims the benefit of provisional application No. 60/256,616, filed Dec. 19, 2000.

BACKGROUND OF THE INVENTION

The present invention relates to prills of nitrogen-containing salts having enhanced structural integrity or thermal stability. More particularly, nitrogen-containing salts such as ammonium nitrate are treated with an aminosulfonate product to impart hardness anti-caking and anti-dusting properties to the salt particles without affecting the end use properties of the salt.

Nitrogen-containing salts such as ammonium phosphates, ammonium nitrates, potassium nitrates, and many others are well known as components for fertilizers and explosive compositions. Methods of manufacturing these nitrogen-containing salts as well as methods of processing the nitrogen-containing salts into particles via prill and/or granulation techniques are also well known. The resulting nitrogen-containing salt particles, however, exhibit certain undesirable characteristics. Such particles tend to cake when stored and transported in bulk such that the initial free flowing particles change to a solid, substantially integral mass. Secondly, such particles easily break into smaller particles resulting in a substantial amount of dust being created when handled or transported or when, if used as a fertilizer, eventually applied to the soil. Hardness is important for both explosive and fertilizer applications. In explosive applications it is difficult to achieve the competing goals of porosity and hardness. In fertilizer applications, particle porosity is not particularly important and can be undesirable, but hardness remains important for the reasons outlined above.

In order to overcome the above disadvantages, the prior art has taught a number of conditioning agents which may be added to the nitrogen-containing salt during processing to harden and give anti-caking and anti-dusting properties to the nitrogen-containing salt particles. For example, anti-caking properties have been imparted to nitrogen-containing salt particles by utilizing clay, talc, surfactants, or a combination of these three conditioners, to coat the particles. Additionally, various oils can be sprayed on the particles for controlling dust. Also, a phosphoric acid-boric acid compound known under the trademark "Permalene" and available from Mississippi Chemical, has been utilized in phosphate production as a hardening agent.

European Patent Application 569 118, Nov. 10, 1993 discloses hardening ammonium nitrate prills and granules by combining ammonium nitrate with a functionally active polymer having a molecular weight of 200 to 700,000. The functionally active groups on the polymer can be ionic species such as sulfonates; examples are polystyrene sulfonate and polystyrene sulfonate co-polymerized with maleic anhydride, or, in another example, polyvinyl sulfonate. One embodiment is presented by the formula

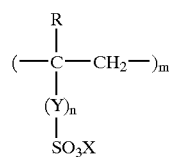

where Y is a connecting group which may be a hydrocarbon of up to 8 carbons.

U.S. Pat. No. 5,597,977, Chattopadhyay, Jan. 28, 1997, discloses hardening ammonium nitrate by combining it with a functionally active polymer such as polystyrenesulfonate or polyvinylsulfonate.

The present invention, therefore, solves the problem of providing prills and other particles of nitrogen-containing salts with improved properties, by adding thereto an aminosulfonate or condensation product thereof, as described in greater detail hereinafter. The addition of aminosulfonate or condensation product to the inorganic nitrogen-containing salts generally results in harder particles less susceptible to breakage and formation of fines, and/or provides anti-caking and anti-dusting properties in one step without the need for any secondary or additional conditioners.

SUMMARY OF THE INVENTION

The present invention provides a composition of matter comprising an admixture of an inorganic nitrogen-containing salt, and an amount of an aminosulfonate or a condensation product thereof sufficient to improve the hardness, anti-caking, or anti-dusting properties of said salt.

The present invention further provides a method of preparing an inorganic nitrogen-containing salt exhibiting, in the solid form, improved hardness, anti-caking, or anti-dusting properties, comprising treating said salt with an aminosulfonate or a condensation product thereof in an amount sufficient to improve any of said properties. Otherwise expressed, it includes a method of preparing particles of a nitrogen-containing salt having improved physical properties, comprising incorporating as a part of said particle or a precursor thereof a property-enhancing amount of an aminosulfonate or a condensation product thereof.

The process of the present invention can also be used in manufacture of fertilizers and other granular products which will typically, but not necessarily, contain ammonium nitrate. Other materials which can be found in such products, and for which the present invention can be beneficial, include nitrogenous products such as ammonium sulfate and ureas, phosphate products such as ammonium phosphate, and potassium products such as potassium sulfate, potassium chloride, and potassium nitrate.

DETAILED DESCRIPTION OF THE INVENTION

An inorganic nitrogen-containing salt, typically selected from the group consisting of inorganic ammonium salts such as ammonium phosphate; and nitrate salts such as ammonium nitrate, and metal nitrates such as alkali or alkaline earth nitrates and mixtures thereof, is treated with an aminosulfonate or condensation product thereof to improve the properties, typically, to harden the nitrogen-containing salt particles and impart anti-caking and anti-dusting properties. The aminosulfonate or condensation product can be used with various inorganic nitrogen-containing salts and can be incorporated into various nitrogen-containing salt manufacturing processes such as granulation and crystallization, i.e. prill, systems to impart the above advantageous properties to nitrogen-containing salts produced in solid particulate forms.

Various preferred features and embodiments will be described below by way of non-limiting illustration.

In preparing the aminosulfonate product treated nitrogen-containing salt of the present invention, the general approach is to select a desired aminosulfonate or condensation product thereof and to prepare an admixture with an inorganic nitrogen-containing salt. The term "admixture" is intended to encompass both homogeneous and heterogeneous mixtures, that is, situations such as those in which the materials are homogeneously mixed in melt or solution as well as those in which the aminosulfonate or condensation product thereof is applied to the surface of granules of the nitrogen-containing salt, e.g., by spraying. In a preferred approach, a first step is to homogeneously mix the aminosulfonate or condensation product with an inorganic nitrogen-containing salt during nitrogen-containing salt production or processing. Typically up to 5.0% by weight aminosulfonate or condensation product thereof can be admixed with to the nitrogen-containing salt, preferably 0.005 to 2%, with 0.01% to 0.7% more preferred, or 0.03 to 0.1 percent. Percentages are expressed as based on the total amount of the treated salt. 0.01% is a preferred practical lower limit since below this dosage, there tends to be an inadequate hardness increase due to insufficient aminosulfonate product for binding, and 0.7% is believed to be a preferred practical upper limit since above this dosage it is believed that hardness once again decreases, which is presumably due to a diluent effect.

By the term "aminosulfonate condensation product" is meant a condensation product, typically an amide or an imide, which can be viewed as the reaction product of an aminosulfonate or aminosulfonic acid, specifically, the amine functionality thereof, and an acylating compound, that is, an acid, anhydride, or reactive equivalent. The term "condensation product" is used even though certain of the materials may not in fact be formed by a condensation reaction. An illustration of this is 2-acrylamido-2-methylpropanesulfonic acid (sold as AMPS® monomer, available from The Lubrizol Corporation). This material can be formally seen as the condensation product of 2-amino-2-methylpropanesulfonic acid with acrylic acid:

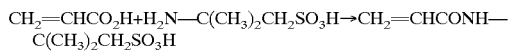

AMPS® monomer)+H$_2$O
although in fact this material is typically prepared by the reaction of acrylonitrile sequentially with a isobutylene and source of SO$_3$ such as sulfuric acid or oleum (fuming sulfuric acid, i.e., sulfuric acid containing excess SO$_3$), as taught in U.S. Patent U.S. Pat. No. 3,544,597, Killam, Dec. 1, 1970.

The aminosulfonate condensation products of the present invention can be any of a wide variety of materials which, however, contain the general structure $$>N-(CR_1R_2)_n-SO_3X \qquad (I)$$

where >N represents a nitrogen atom which is a part of an amide or imide structure, and in the case of an amide, the remaining valence typically being bonded to a hydrogen atom or to a hydrocarbyl group; each $R_1$ and $R_2$ are independently hydrogen or hydrocarbyl groups, n is 1 to 4, typically 1 or 2, and preferably 2, and X is hydrogen, an ammonium ion, or a metal ion, preferably an alkali or alkaline earth metal, and most preferably an ammonium ion. As used herein, the term "ammonium ion" is intended to encompass both the unsubstituted ammonium ion, NH$_4^+$, as well as substituted ammonium ions derived from amines, generally NR$_4^+$, where R is hydrocarbyl or hydrogen. The unsubstituted ammonium ions are preferred. When X is hydrogen, the material is an aminosulfonic acid product, rather than literally a "sulfonate," (i.e., sulfonic acid salt), but all such materials are intended to be encompassed by the general term "aminosulfonate or condensation product thereof."

One class of aminosulfonate condensation products is based on the AMPS® monomer, which has been briefly described above. This is a material encompassed within the formula (I) above wherein n is 2; the $R_1$ and $R_2$ on the carbon atom attached to the nitrogen are both methyl, and on the carbon atom attached to the sulfur, both $R_1$ and $R_2$ are hydrogen; and one valence on the nitrogen atom is satisfied by hydrogen and the other by an acrylic group, CH$_2$=CHC(O)—. Variations, of course, are possible and are well within the ability of the skilled person to prepare. For instance, a methacrylic group can be used in place of the acrylic group. Alternatively, different entities can be employed for the $R_1$ and $R_2$ groups, such that only one methyl substituent is present, or $R_1$ or $R_2$ can be an ethyl group or other lower hydrocarbyl group. Other useful materials of this class include 2-acrylamidoethanesulfonic acid, 2-acrylamidopropanesulfonic acid, 2-methacrylamidopropanesulfonic acid, and 2-methacrylamido-2-methylpropanesulfonic acid. Such materials and their methods of preparation are disclosed, for instance, in U.S. Pat. No. 3,544,597.

Materials of the formula (I) where n=2 are also referred to as taurine derivatives. Taurine itself may be represented by H$_2$N—CH$_2$—CH$_2$—SO$_3$H, although it (and related materials) may exist predominantly in the zwitterionic form. Taurine is commercially available and can be prepared by the reaction of ethyleneimine with aqueous sulfur dioxide.

The substituents on the nitrogen atom of (I) may be other than a relatively simple unsaturated carboxylic group. For instance, the acylating group may have a structure represented by

where X can be NH, S, or O, and R is a hydrocarbyl group containing up to 24 carbon atoms, preferably up to 18, and more preferably up to 12 carbon atoms. R can be aromatic or aliphatic. Materials incorporating this type of acylating group can be prepared by addition of an O, N, or S-containing material to the double bond of an acrylate. These reactions are known to those skilled in the art; some examples are set forth in greater detail in PCT publication WO 00/24708 and UK Patent 1,550,420.

The groups attached to the N atom in formula (I) can also be in the form of an imide structure. Thus the aminosulfonate can be reacted with a diacid acylating agent (or its reactive equivalent, such as the anhydride) to form an imide. When the diacid acylating agent is a succinic anhydride or a substituted succinic anhydride, the product will be a succinimide (III):

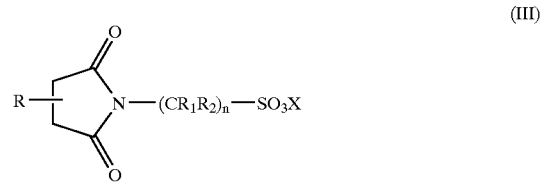

It will be recognized that, when R is a hydrocarbyl group, structure (III) is reminiscent of succinimide dispersants, materials which are particularly well known in the art of lubricant additives and which are described, along with methods of their synthesis, in U.S. Pat. No. 4,234,435.

The hydrocarbyl group R in structure (III) typically contains 2 to 30 carbon atoms, preferably 8 to 18 carbon atoms, and more preferably 10 to 14, or about 12, carbon atoms. R can be a branched or linear structure.

Alternatively, the acylating group can be the reaction product of an olefinic hydrocarbon (or substituted hydrocarbon, along the lines of the substitution permitted in the definition of "hydrocarbyl") and a glyoxylic acid or glyoxylic acid derivative, homologue, or equivalent (such as, e.g., the hydrated form). These materials and their preparation are described in greater detail in U.S. Pat. Nos. 6,114,547 and 5,786,490. In summary, these are materials, which may be in the form of a lactone, which can be prepared by reacting, in the presence of an acidic catalyst such as organic sulfonic acids, heteropolyacid, and mineral acids, the following materials: (A) an olefinic compound of the general formula $$(R^1)(R^2)C=C(R^6)(CH(R^7)(R^8))$$

and (B) at least one carboxylic reactant selected from the group consisting of compounds of the formula $$R^3C(O)(R^4)_nC(O)OR^5$$

and compounds of the formula

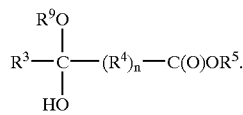

In the above formulas, each $R^1$, $R^2$, $R^3$, $R^5$, and $R^9$ is independently hydrogen or a hydrocarbyl group and each of $R^6$, $R^7$ and $R^8$ is, independently, hydrogen or a hydrocarbyl group, provided that at least one is a hydrocarbyl group containing at least 7 carbon atoms. $R^4$ is a divalent hydrocarbylene group, and n is 0 or 1. The relative amounts of (A) and (B) are such that preferably 0.6 to 1.5 moles (B) is employed per equivalent of (A). The olefin employed preferably has a number average molecular weight of 100 to 70,000, more preferably 400 to 3000. The olefin is preferably a polybutene, and more preferably a polyisobutene. Alternatively, the olefin can be a linear alpha olefin containing 8 to 28 carbon atoms.

EXAMPLE A
Preparation of Taurimide

To a 3 L, 4-necked flask, equipped with mechanical stirrer, nitrogen inlet, thermocouple, and condenser is charged 266 g (1.0 equivalents) of dodecenyl succinic anhydride. Taurine, 125.15 g (1.0 eq.), water, 516.9 g, and 50 wt. % aqueous sodium hydroxide, 80 g (1.0 eq.) are separately mixed and this mixture is added to the flask at room temperature. The reaction mixture is heated to 97° C., with stirring, over a 2.5 hour period, then maintained at 101–102° C. for 24 hours, taking care to avoid excessive foaming. The reaction product is an aqueous solution or mixture of taurimide. A significant product is the taurimide; an additional product is the amide in which one of the two carboxylic groups is the unreacted sodium salt. The additional product, as well as the mixture of products, are also considered to represent embodiments suitable for the present invention.

EXAMPLE B

Example A is substantially repeated, except in place of the taurine there is used an equivalent amount of 2-amino-2-methylpropanesulfonic acid (2,2-dimethyltaurine).

The AMPS® monomer and other ethylenically unsaturated materials of the present invention can be further reacted through the site of unsaturation to provide other aminosulfonate products suitable for the present invention. The monomer can be reacted with amines, and in particular polyamines having at least one primary or secondary nitrogen, to provide an adduct. Examples of those materials are those described in detail in PCT patent publication WO 00/24708 (Application US99/23227).

Alkylene diamines are well known materials having a general structure $H_2N-(C_nH_{2n})-NH_2$ in their unsubstituted form. In this formula, n is a number of at least 2, generally 2 through 6, preferably 2 through 4, and in one preferred embodiment, 3. Such materials correspond to ethylene diamine, propylene diamines, butylene diamines, pentylene diamines, and hexylene diamines (such as hexamethylene diamine), and include both the normal or linear materials as well as the branched materials. The nitrogen atoms can be located in the $\alpha,\beta$ positions or in other positions such as the $\alpha,\omega$ positions, as in the case of 1,3-propylene diamine, which is a preferred material.

Suitable diamines include preferably N-substituted alkylenediamines, that is, those in which one hydrogen atom of one or of both of the nitrogen atoms is replaced by an atom other than hydrogen. The alkylenediamine can then be represented by the structure $R^1NH-(C_nH_{2n})-NHR^7$, where $R^1$ and $R^7$ are each independently hydrogen, hydrocarbyl groups, hydroxyhydrocarbyl groups, alkoxyhydrocarbyl groups, aminohydrocarbyl groups, or aminohydrocarbyl groups. In a the preferred material, the diamine is mono-substituted by a hydrocarbon group or an alkoxyalkyl group such as an alkoxypropyl group. The preferred hydrocarbon substituent is an aliphatic hydrocarbon group containing 1 to 30 carbon atoms, preferably 4 to 24 carbon atoms, more preferably 8 to 18 carbon atoms. In another preferred embodiment, the N-substituted alkylenediamine is a mono-$N-C_{10-18}$ hydrocarbon-substituted propylene diamine. In another preferred embodiment, the N-substituted alkylenediamine is a mono-$N-C_{4-10}$ hydrocarbon-substituted propylene diamine.

The diamine is reacted with one or more, preferably at least two, and most preferably about two equivalents of the ethylenically unsaturated amidoalkanesulfonic acid (or a salt or other equivalent) thereof. The reaction is sometimes referred to as a Michael addition, details of which are reported in the above-mentioned WO 00/24708.

Among the suitable amines for preparing such adducts are certain amines available from AKZO under the names Duomeen O™ amine, an N-oleyl-1,3-diaminopropane, Duomeen T™ amine, an N-tallow-1,3-diaminopropane, Duomeen C™ amine, an N-coco-1,3-diaminopropane and Duomeen S™ amine, an N-soya-1,3-diaminopropane. Another suitable amine is a triamine having the general structure $C_{6-30}$ aliphatic-$NH(CH_2)_3NH(CH_2)_3NH_2$, which is an N-aliphatic dipropylenetriamine. Preferably the aliphatic group therein contains up to 22 carbon atoms and most preferably contains from 10 to 18 carbon atoms. This amine is available from AKZO as Trimeen T™ amine.

A preferred adduct can be represented by the structure

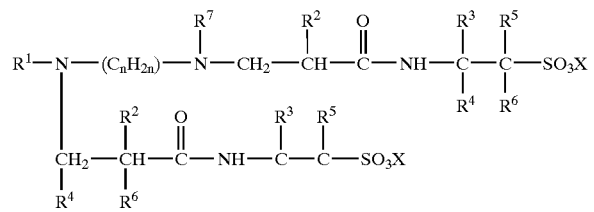

and an alternative structure which may also be present, preferably in minor amounts, can be represented by

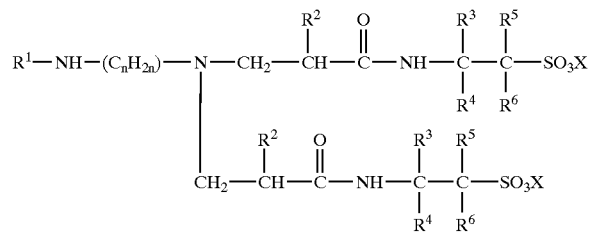

A similar structure in which three acrylamidoalkanesulfonic acid groups have added to the structure can also be present.

In the above structures the parameters typically have the following values: n is 2 to 6; $R^1$ and $R^7$ are each independently hydrogen, hydrocarbyl groups, hydroxyhydrocarbyl groups, alkoxyhydrocarbyl groups, aminohydrocarbyl groups, aminohydrocarbyl groups wherein the amine nitrogen is substituted by

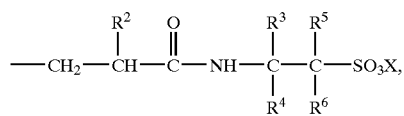

alkoxy-terminated or amine-terminated polyether groups, additional groups of the structure

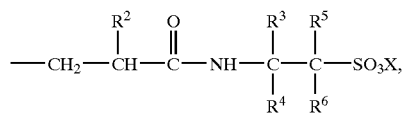

or mixtures thereof;
$R^2$ through $R^6$ are each independently hydrogen or hydrocarbyl groups; and each X is independently hydrogen, metal, or ammonium or substituted ammonium.

Suitable conditions leading to the reaction suitable for forming the above-described adducts include combining the amine with an appropriate amount of the salt of an acrylamidoalkanesulfonic acid in a suitable solvent (such as water and/or alcohols) at a temperature of 40 to 130° C., preferably 70 to 100° C. for 4 to 30 hours. The total concentration of the reactants can be 1 to 50% by weight, preferably 5 to 30% by weight. Optionally, a free radical inhibitor such as monomethyloxyhydroquinone can be used at a suitable concentration such as 1000 parts per million.

EXAMPLE C

To a 3 L, 4-necked flask, equipped with mechanical stirrer, nitrogen inlet, thermocouple, and condenser is charged 161 g (1.0 equivalents) of Duomeen T™ (N—$C_{18}$ alkyl substituted propylenediamine, from Akzo Nobel), along with 0.5 g of a hydroquinone-based polymerization inhibitor and 744 g water. The mixture is heated to 65° C. and a 58% aqueous solution of the sodium salt of AMPS® monomer from the Lubrizol Corporation, 395 g (1.0 equivalents), is added. The reaction mixture is heated to 95° C. and maintained at this temperature for 6.5 hours, then heated to reflux at 99–100° C. and maintained at this temperature for an additional 6.5 hours. The reaction product is cooled to room temperature and used as an aqueous solution. Water can be removed, if desired, by conventional means.

EXAMPLE D

To a 1L, 4-neck flask, equipped with a mechanical stirrer, air inlet, thermocouple, condenser and addition funnel is added 185.3 g sodium salt of AMPS® monomer (50% aqueous solution) and 389.3 g water. The mixture is heated to and maintained at 85° C., and 68.0 g Duomeen T™ (molten) is added dropwise through an addition funnel over a 40 minute period. The mixture is maintained at temperature for an additional 6 hours, then allowed to cool to room temperature. A charge of 18 g HCl (36.5–38%, aqueous) is added via a subsurface addition tube until pH of 9.0 at 25° C. is obtained. The reaction product can be used as the aqueous solution.

The aminosulfonate condensation product can also be a polymer. Materials such as AMPS® monomer which contain ethylenic unsaturation can be homopolymerized or copolymerized to form useful products. The polymer will typically have a number average molecular weight of less than 500,000 or less than 100,000. Copolymers are generally preferred, and copolymers with relatively less polar monomers are particularly useful since they are believed to be less hygroscopic. Such copolymers and their method of preparation are known and have been disclosed in detail in European Patent Application 811677.

The hydrophobic monomers can be alkyl substituted acrylamides, alkyl substituted methacrylamides, acrylate esters and methacrylate esters. When the polymer contains alkyl substituted acrylamides and alkyl substituted methacrylamides as the hydrophobic monomer then the molar percentage of the hydrophobic monomer is typically 25 to 95 percent. When the polymer contains alkyl substituted acrylates and alkyl substituted methacrylates as the hydrophobic monomer then the molar percentage of hydrophobic monomer is typically 25 to 90 percent. In the polymerization reaction the ethylenic linkages polymerize and the resulting polymer consists of a polyethylene backbone with hydrophilic and hydrophobic side chains.

Among the less polar monomers which can be employed are (I) alkyl substituted acrylamide compounds having the formula:

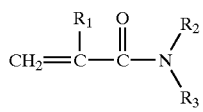

wherein $R_1$ is a hydrogen or a methyl group and $R_2$ and $R_3$ are independently hydrogen or hydrocarbyl groups, provided that the total number of carbon atoms in $R_2$ and $R_3$ combined is between 2 and 36, and (II) acrylate esters of the following formula:

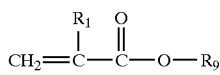

where $R_1$ is a hydrogen or a methyl group and $R_9$ is a hydrocarbyl group containing between 1 and 20 carbon atoms.

Other hydrophobic and hydrophilic monomers can also be present, as described in detail in the above-mentioned European Patent Application 811677.

EXAMPLE D

A 200 mL resin flask is charged with 40 grams (0.101 moles) of 2-acrylamido-2-methylpropanesulfonic acid sodium salt (58% monomer, 42% $H_2O$), 4.3 g (0.033 moles) of t-butylacrylamide (t-BAA), 0.014 g (0.16 mmole) of sodium bicarbonate ($NaHCO_3$) and 20 g of methanol. A nitrogen purge at 3 L/hr (0.1 std. $ft^3$/hr.) is begun and the mixture is heated to 70° C. with stirring.

In a separate beaker 0.014 g. (0.06 mmole) of sodium persulfate ($Na_2S_2O_8$) is dissolved in 3 g of $H_2O$. This solution is taken up in a syringe which is placed on a syringe pump set to deliver 0.07 mL/minute. The $Na_2S_2O_8$ solution is added to the resin flask over a 45 minute period. Thirty minutes after addition is complete, 20 mL of water and 45 mL of methanol are added and the mixture is stirred at 70° C. for three hours. The contents of the flask are poured into a crystallizing dish and dried at 80° C. for 20 hours to yield 27.5 g of product containing 11.3% sulfur and 6.4% nitrogen and having an inherent viscosity of 2.28 dL/g at 30° C. in methanol.

One characteristic of the most effective aminosulfonate compounds, whether monomeric or polymeric, is that they contain a sufficient portion of relatively hydrophobic component that the compound as a whole is not excessively hygroscopic, while still favorably interacting with the salt which is to be treated.

The aminosulfonates and condensation products thereof of the present invention, whether monomeric or polymeric, can be in the form of the unneutralized acid or in the form of a salt. The reaction to form the salt is a simple neutralization of an acrylamidoalkanesulfonic acid, usually with a metal base or amine comprising at least one metal oxide, metal hydroxide, metal salt of a weak acid such as carbonic, boric or acetic acid or amine. The neutralizing salt is most often a metal carbonate or bicarbonate, e.g., sodium carbonate or sodium bicarbonate. Also useful, in place of such salts, are cation exchange resins in the metal salt form (usually alkali metal and especially sodium), typically strong acid or weak acid resins in which the acid group may be, for example, sulfonic or carboxylic acid groups.

The cations in the salt form of the aminosulfonate material are typically selected from the group consisting of alkali metal cations, alkaline earth cations, cations of the transition metals—Sc, Ti, V, Cr, Mn, Fe, Co, Ni, Cu, and Zn—and ammonium cations of the following formula:

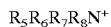

where $R_5$, $R_6$, $R_7$, and $R_8$ are independently hydrogen or hydrocarbyl groups. Preferably the total number of carbon atoms in the ammonium cation does not exceed 21. Among the preferred metal salts are the alkali metal and alkaline earth metal salts, chiefly those of lithium, sodium, potassium, magnesium, calcium and barium, and especially those of sodium, potassium, magnesium and calcium. Sodium and ammonium salts are most preferred. Such materials and their methods of preparation are disclosed, for instance, in U.S. Pat. No. 3,544,597.

Many of the above and other derivatives of aminosulfonates, as well as their preparation, are disclosed in U.S. Pat. No. 4,620,855, Higgins, Nov. 4, 1986.

The nitrogen-containing salts utilized in the present invention can be selected from the commonly known salts consisting of ammonium phosphates, ammonium nitrates, potassium nitrates, potassium chlorides, potassium sulfates, calcium phosphates, and mixtures thereof. All of the above nitrogen-containing salts as well as their methods of production are commonly known and need not be described in detail herein.

In a preferred embodiment, the inorganic nitrogen-containing salt is ammonium nitrate and the aminosulfonate or condensation product thereof is the adduct of 2-acrylamido-2-methylpropanesulfonic acid with N—$C_{18}$ alkyl substituted propylenediamine.

In one embodiment of the present nitrogen-containing salt prill production, a nitrogen-containing salt generally at least 70% solids concentration in water is heated in evaporators to about 140° C. to remove substantially all the water. The molten nitrogen-containing salt is then injected as droplets to an air cooling tower where crystalline nitrogen-containing salt is formed as a hard prill or bead used for shipment. The aminosulfonate material is soluble in the molten nitrogen-containing salt and solidifies with the nitrogen-containing salt when cooled in the air cooling tower. The aminosulfonate material is the ingredient that provides the desired advantages for the nitrogen-containing salt and once the molten nitrogen-containing salt and aminosulfonate product are crystallized it is believed that the aminosulfonate material serves to encase or entrap the nitrogen-containing salt to harden and give anti-caking and anti-dusting properties to the nitrogen-containing salt particles. Aminosulfonate material in either powder or liquid form can be utilized.

The following procedure is utilized in obtaining the hardness or crushing strength data referred to above. In this procedure the nitrogen-containing salt being tested is melted, slurried or dissolved in a small metal dish. A predetermined amount of conditioner or aminosulfonate material is added and the two are thoroughly mixed to form a consistent mixture or solution. The system is then cooled and dried, giving crystal plates or granules suitable for crushing. These plate or granule segments are crushed using a cone or needle penetrometer to obtain a measure of the relative crushing strength of the various conditioners. The penetrometer is used with a 64.5 $mm^2$ (0.1 $in^2$) area spindle. Force is read from a gauge and crushing strength is calculated therefrom. In the screening test, visual observation is employed to determine whether a conditioner that increases granule or plate hardness also imparts anti-caking and anti-dusting properties. More accurate anti-caking and anti-dusting evaluations can be performed separately by long-term storage or accelerated storage tests.

The hardness as well as the anti-caking and anti-dusting properties of nitrogen-containing salts, in particular, ammonium nitrate prill, increases significantly when an aminosulfonate or condensation product thereof is employed therewith.

The aminosulfonate material that provides the advantageous properties of the present invention can also be utilized with ammonium nitrate, potassium nitrate, and ammonium phosphate nitrogen-containing salts produced in solid particulate form by conventional granulation methods.

For example, when conventionally producing granular ammonium phosphate, phosphoric acid is neutralized with ammonia in a series of ammoniation reaction tanks where the heat of reaction evaporates a part of the water introduced with the acid. The extent of ammoniation is controlled to yield a slurry composition ranging from monoammonium phosphate to two-thirds diammonium phosphate, depending on the grade of product desired. This slurry flows to a pugmill or blunger in which it is granulated by mixing with recycled product fines. The granules are then dried and screened to provide a product fraction and a finer recycle fraction. Recycle ratios in the order of 8:1 are required for proper control of granulation. In one variation of the process, a rotary drum granulator is substituted for the blunger. Products made in this manner contain 11% N and 21% P, predominantly monoammonium phosphate; and 16% N and 21% P, about one-third monoammonium and two-thirds diammonium phosphate. Other grades such as one containing 16% N and 8.7% P and another with 13% N and 17% P can be made by adding sulfuric acid to the ammoniators, in which case the product contains ammonium sulfate. In still another variation, unfiltered extract from a phosphoric acid plant is used to produce lower grades that contain calcium sulfate.

Diammonium phosphate containing 18% N and 20.1% P is also made by a process in which phosphoric acid is neutralized with ammonia in a rotary drum granulator. Heated air and dry recycled fines are introduced in the granulator to reduce the moisture content to the proper level for granulation. The gases leaving the granulator are scrubbed with the incoming acid. The product is dried and then screened.

An alternate process for a material containing 18% N and 20.1% P also uses a rotary granulation drum. Phosphoric acid is neutralized in a prereactor with anhydrous ammonia to an $NH_3:H_3PO_4$ mole ratio of about 1.3, a point near the maximum solubility of the system. The slurry thus produced is fed to the granulator along with recycled fines. Additional ammonia is added in the granulation step to give a mole ratio of about 2, a point of minimum solubility. The excess ammonia required to drive the reaction to diammonium phosphate is recovered by scrubbing the exhaust gases with the incoming acid before it is fed to the prereactor. The product from the granulator is dried and screened. In addition to the material containing 18% N and 20.1% P, a large variety of grades rich in diammonium phosphate can be conventionally produced by neutralizing with ammonia-ammonium nitrate solutions rather than anhydrous ammonia, substituting sulfuric acid for part of the phosphoric acid, or adding various solid nitrogen-containing salt ingredients to the ammoniator.

Ammonium nitrate can be conventionally produced in granular form substantially as described by the above processes by initially starting with the neutralization of nitric acid with ammonia in the ammoniation reaction tanks. In one process, the initial output from the reaction contains a mixture of 83–87% ammonium nitrate and the balance water. This material can be concentrated by evaporation to 95–99+% ammonium nitrate (still a solution, liquid, or melt) and the material is forced through spray equipment at the top of a prilling tower. The material is air cooled, and, in some instances, more completely dried, while descending the tower, to form solid prills. Low density prills (0.77 $g/cm^3$ (48 $lb/ft^3$)) can be made from high moisture content (3–5% water) acrylonitrile solutions. High density prills (0.86 $g/cm^3$ (54 $lb/ft^3$)) can be made from low moisture content (0.5% water) material.

Similarly, potassium nitrate can be conventionally produced in granular form from potassium chloride and sodium nitrate while ammonium phosphate can be conventionally produced in granular form from ammonia and phosphoric acid.

In any of the above nitrogen-containing salt granulation processes, up to 5.0% aminosulfonate product by weight can be added to the nitrogen-containing salt, and it is preferred to add 0.01% to 0.7% by weight aminosulfonate product in the granulation process. The aminosulfonate product in either liquid or solid form can be incorporated in the granulation process in the reaction tanks, in the recycled fines, or directly in the granulators. Preferably, the aminosulfonate product is incorporated in the recycled fines and is sprayed onto the particles within the granulators where it aids in building the size of the granules being formed therein. The hardness of the resultant nitrogen-containing salt granules is increased to thus provide stronger nitrogen-containing salt granules having improved anti-caking and anti-dusting properties.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character.

Examples of hydrocarbyl groups include:

hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy);

hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

It is known that some of the materials described above may interact in the final formulation, so that the components of the final formulation may be different from those that are initially added. For instance, metal ions can migrate to other acidic or anionic sites of other molecules. The products formed thereby, including the products formed upon employing the composition of the present invention in its intended use, may not susceptible of easy description. Nevertheless, all such modifications and reaction products are included within the scope of the present invention; the present invention encompasses the composition prepared by admixing the components described above.

EXAMPLES

Example 1

A mixture is prepared of 99.94% molten ammonium nitrate and 0.06% of a water solution containing the reaction products of AMPS® monomer (sodium salt) and Duomeen C™. The resulting mixture is forced through spray equipment at the top of a prilling tower and air cooled while descending, to form prills. The prills and their crystal transitions are evaluated by differential scanning calorimetry.

Example 2

A mixture is prepared of 99.94% molten ammonium nitrate and 0.06% of a water solution containing the reaction product of AMPS® monomer (sodium salt) and Duomeen C™. The resulting mixture is allowed to cool and crystallize. Following crystallization, the crystal transitions normally observed at approximately 30° C. and 87° C. for ammonium nitrate are not observed. In addition, the energy (as measured by heat flow) of the transitions at 125° C. and (especially) 170° C. is much greater than that of untreated ammonium nitrate.

Example 3

A mixture is prepared of 99.94% molten ammonium nitrate and 0.06% of a water solution containing the reaction product of AMPS® monomer (sodium salt) and Duomeen T™. The resulting mixture is allowed to cool and crystallize. Following crystallization, the crystal transitions normally observed at approximately 30° C. and 87° C. for ammonium nitrate are not observed. In addition, the energy (as measured by heat flow) of the transitions at 170° C. and (especially) 1125° C. is much greater than that of untreated ammonium nitrate.

Example 4

A mixture is prepared of 99.94% molten ammonium nitrate and 0.06% of a water solution containing the copolymer of AMPS® monomer (sodium salt) and N-tertiary butyl acrylamide. The resulting mixture is allowed to cool and crystallize. Following crystallization, the crystal transition normally observed at approximately 30° C. for pure ammonium nitrate is shifted to approximately 45° C. It is also noted that the transition measured at 87° C. for unadditized ammonium nitrate is now observed in two separate peaks. In addition, the energy (as measured by heat flow) of the transition at 125° C. is much greater than that of untreated ammonium nitrate.

Example 5

A mixture is prepared of 99.94% molten ammonium nitrate and 0.06% of a water solution containing the ammonium salt of AMPS® monomer. The resulting mixture is allowed to cool and crystallize. Following crystallization, the crystal transition at approximately 30° C. for pure ammonium nitrate is shifted from a relatively sharp transition to a broad peak centered at approximately 45° C. The transition normally measured at 87° C. for unadditized ammonium nitrate is not observed. In addition, the energy (as measured by heat flow) of the transition at 170° C. and (especially) 125° C. is much greater than that of untreated ammonium nitrate.

Example 6

A mixture is prepared of 99.94% molten ammonium nitrate and 0.06% of a water solution containing the reaction product in Example A. The resulting mixture is allowed to cool and crystallize. Following crystallization, the crystal transition normally observed at approximately 30° C. for pure ammonium nitrate is now observed at approximately 40° C. Moreover, the transition measured at 87° C. for unadditized ammonium nitrate is greatly decreased in energy. In addition, the energy (as measured by heat flow) of the transitions at 125° C. is much greater than that of untreated ammonium nitrate.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the upper and lower amount, range, and ratio limits set forth herein may be independently combined. As used herein, the expression "consisting essentially of" permits the inclusion of substances which do not materially affect the basic and novel characteristics of the composition under consideration.

What is claimed is:

1. A composition of matter comprising an admixture of an inorganic nitrogen-containing salt, and an amount of an aminosulfonate or a condensation product thereof sufficient to improve the hardness, anti-caking, or anti-dusting properties of said salt.

2. The composition of claim 1 wherein said inorganic nitrogen-containing salt is selected from the group consisting of ammonium nitrate, ammonium phosphate, potassium nitrate, and mixtures of said salts.

3. The composition of claim 1 wherein said aminosulfonate or condensation product thereof comprises 0.01% to 0.7% by weight of said admixture.

4. The composition of claim 1 wherein said aminosulfonate or condensation product thereof contains the general structure

$$>N-(CR_1R_2)_n-SO_3X \qquad (I)$$

where >N represents a nitrogen atom which is a part of an amide or imide structure; each $R_1$ and $R_2$ are independently hydrogen or hydrocarbyl groups, n is 1 to 4, and X is hydrogen, an ammonium ion, or a metal ion.

5. The composition of claim 4 wherein n is 2.

6. The composition of claim 1 wherein said aminosulfonate or condensation product thereof is selected from the group consisting of 2-acrylamido-2-methylpropanesulfonic acid, salts of 2-acrylamido-2-methylpropanesulfonic acid, adducts of 2-acrylamido-2-methylpropanesulfonic acid, polymers of 2-acrylamido-2-methylpropanesulfonic acid and its salts, taurine, taurine derivatives, and salts of taurine and taurine derivatives.

7. The composition of claim 1 wherein the inorganic nitrogen-containing salt is ammonium nitrate and the aminosulfonate or condensation product thereof is the adduct of 2-acrylamido-2-methylpropanesulfonic acid or a salt thereof with N—$C_{18}$ alkyl substituted propylenediamine.

8. A method of preparing an inorganic nitrogen-containing salt exhibiting, in the solid form, improved hardness, anti-caking, or anti-dusting properties, comprising:

treating said salt with an aminosulfonate or a condensation product thereof in an amount sufficient to improve any of said properties.

9. The method of claim 8, wherein the treatment comprises:
preparing an admixture of said inorganic nitrogen-containing salt and said aminosulfonate or condensation product thereof; and further comprising
processing said admixture into a particulate form.

10. The method of claim 8 wherein said aminosulfonate or condensation product thereof is mixed with molten or dissolved inorganic nitrogen-containing salt prior to cooling of the resulting mixture under conditions to produce prill.

11. The method of claim 8 wherein said treatment comprises spraying said aminosulfonate product onto granules of the inorganic nitrogen-containing salt.

12. The method of claim 8 wherein said aminosulfonate product comprises 0.01% to 0.7% by weight of the treated inorganic nitrogen-containing salt.

13. The method of claim 8 wherein said aminosulfonate or condensation product thereof contains the general structure

  (I)

where >N represents a nitrogen atom which is a part of an amide or imide structure; each $R_1$ and $R_2$ are independently hydrogen or hydrocarbyl groups, n is 1 to 4, and X is hydrogen, an ammonium ion, or a metal ion.

14. The method of claim 13 wherein n is 2.

15. The method of claim 8 wherein said aminosulfonate or condensation product thereof is selected from the group consisting of 2-acrylamido-2-methylpropanesulfonic acid, salts of 2-acrylamido-2-methylpropanesulfonic acid, adducts of 2-acrylamido-2-methylpropanesulfonic acid, polymers of 2-acrylamido-2-methylpropanesulfonic acid and its salts, taurine, taurine derivatives, and salts of taurine and taurine derivatives.

16. The method of claim 8 wherein the inorganic nitrogen-containing salt is ammonium nitrate and the aminosulfonate or condensation product thereof is the adduct of 2-acrylamido-2-methylpropanesulfonic acid or a salt thereof with N—$C_{18}$ alkyl substituted propylenediamine.

* * * * *